(12) United States Patent
Miyakoshi (10) Patent No.: US 6,743,981 B2
(45) Date of Patent: Jun. 1, 2004

(54) WATERPROOF STRUCTURE OF ELECTRIC JUNCTION BOX

(75) Inventor: Koji Miyakoshi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/146,057

(22) Filed: May 16, 2002

(65) Prior Publication Data

US 2003/0000726 A1 Jan. 2, 2003

(30) Foreign Application Priority Data

Jun. 12, 2001 (JP) ........................................ 2001-177341

(51) Int. Cl.[7] ................................................. H02G 3/18
(52) U.S. Cl. ............... 174/65 G; 174/65 R; 174/655.5; 174/135; 16/2.1; 248/56
(58) Field of Search ............................. 174/65 G, 65 R, 174/65.53, 135, 153 G, 152 G; 16/2.4, 2.2; 248/56; 439/604

(56) References Cited

U.S. PATENT DOCUMENTS 5,567,916 A * 10/1996 Napiorkowski et al. 174/153 G
5,806,139 A * 9/1998 Anderson et al. .............. 16/2.1
6,133,528 A * 10/2000 Henriott et al. ........... 174/65 G
6,372,986 B1 * 4/2002 Saeki et al. ................ 174/65 G

FOREIGN PATENT DOCUMENTS

JP  8-288667    11/1996
JP  11203972  *  7/1999

* cited by examiner

*Primary Examiner*—Dhiru R Patel
(74) *Attorney, Agent, or Firm*—Armstrong, Kratz, Quintos, Hanson & Brooks, LLP (57) ABSTRACT

A waterproof structure of an electric junction box is provided, by which a grommet can securely prevent water from entering into a case even when the water has high energy. A flange of a grommet fits into a guide member of the case of the junction box, a cover covers the case, and the flange includes at least two flange parts formed integrally with each other, a height and width of the first flange part situated relatively farther from the case being formed smaller than those of the second flange part situated relatively nearer to the case, respectively. The case is provided with first and second guide walls fitting with the first and second flange parts, respectively. Each top of the first and second flange parts projects higher than the guide member so that both tops adhere to the cover.

8 Claims, 6 Drawing Sheets

WATERPROOF STRUCTURE OF ELECTRIC JUNCTION BOX

BACKGROUND OF THE INVENTION (1) Field of the Invention

The present invention relates to a waterproof structure of an electric junction box, in which a grommet for waterproof is mounted thereon to guide a wiring harness out from the junction box, thereby preventing water from entering into the junction box.

(2) Description of the Related Art

Figure 11:
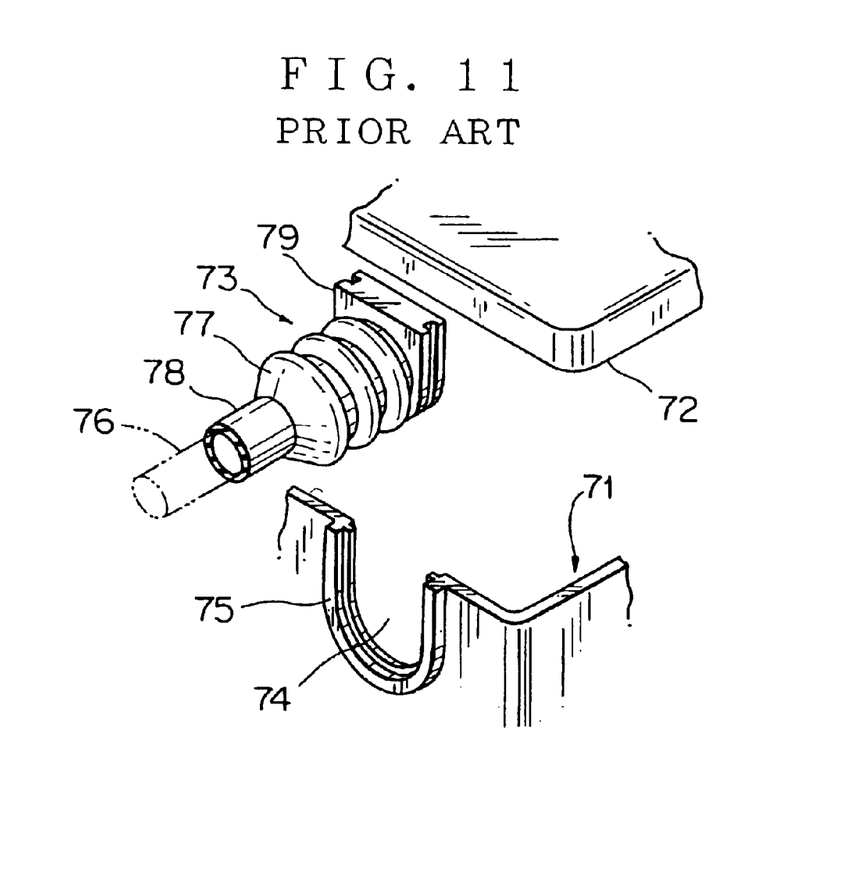
FIG. 11 is an exploded perspective view illustrating an example of a conventional waterproof structure of an electric junction box.

FIG. 11 illustrates a typical example of a conventional waterproof structure of an electric junction box.

The electric junction box (hereinafter, junction box) includes a case 71 made of synthetic resin, a cover 72 made of synthetic resin, a junction unit (not shown) including a fuse, relay and so on, which is received in the case 71, and a resilient grommet 73 for waterproof. A U-shaped notch 74 for guiding out a wiring harness is formed on one side wall of the case 71 and a guide member 75 is formed projectingly outward from the periphery of the notch 74. The grommet 73 slidingly fits into the guide member 75 so that the wiring harness (a plurality of wires) 76 continuing to the junction unit (not shown) is inserted through the grommet 73 and guided out therefrom.

The grommet 73 includes a bellows 77, a cylinder 78 having small diameter continuing to one end of the bellows 77, a flange 79 continuing to the other end of the bellows 77, and a reinforcing member (not shown) made of synthetic resin fit into the flange 79. The flange 79 slidingly fits into the guide member 75 of the case 71 and the cover 72 covers the case 71 so as to make the upper surface of the flange 79 adhere to the lower surface of the cover 72, thereby preventing water from entering into the case 71 from the outer periphery of the flange 79.

A rectangular annulus packing (not shown) is provided on the inner periphery of the cover 72 and the upper edge of the case 71 adheres to the packing, thereby preventing water from entering from the junction between the case 71 and cover 72. The end of the cylinder 78 of the grommet 73 is wound with a vinyl tape (not shown) after the wiring harness 76 is inserted through the grommet 73, thereby preventing water from entering.

However, in the conventional waterproof structure of a junction box, for example in a case of truck, in which the junction box is mounted thereon being exposed to outside, when rainwater leaped up during traveling, water during vehicle washing or high-pressure water during vehicle washing with the high-pressure water directly hits the flange 79 of the grommet 73, the water enters between the flange 79 and case 71 or cover 72, thereby causing a problem. In the event that water enters into the case 71, the water possibly adversely affects the junction unit and so on in the case 71.

On the other hand, in Japanese Patent Publication No. H8-288667 (not shown in the figure) described is a structure, in which the case is formed with double walls and each wall fits into the flange of the waterproof grommet. However, in this case, the waterproof structure becomes large in size and the structure of the grommet becomes complicated, thereby causing another problem.

SUMMARY OF THE INVENTION

It is therefore an objective of the present invention to solve the above problems and to provide a waterproof structure of an electric junction box, by which rainwater, water during vehicle washing or high-pressure water during vehicle washing with the high-pressure water, which strongly hits the grommet, does not enter into the case and the waterproof structure can be minimized and simplified.

In order to attain the above objective, the present invention is to provide a waterproof structure of an electric junction box comprising:

a case including a notch and a guide member formed along the periphery of the notch;

a resilient grommet for inserting a wiring harness therethrough including a flange which fits into the guide member; and a cover for covering the case from above the flange, wherein the flange includes at least two flange parts formed integrally with each other, a height and width of the first flange part situated relatively farther from the case being formed smaller than those of the second flange part situated relatively nearer to the case, respectively.

With the construction described above, even when water leaped up during traveling or high-pressure water during vehicle washing strongly hits the flange of the grommet and passes through the adherent portion of the first flange part, the first flange part weakens the water energy and the second flange part securely waterproofs the junction box.

Further, since the first and second flange parts are integrally formed with each other, the waterproof structure according to the present invention is simplified and minimized compared to a conventional grommet having double flanges fitting into double walls of a junction box body, thereby the junction box can be minimized.

Preferably, the case is provided with first and second guide walls fitting with the first and second flange parts, respectively, as the guide member.

With the construction described above, since each flange part is held by the corresponding guide wall, even when high-pressure water hits and bends the first flange part, the second flange part securely waterproofs the junction box without being affected by the water. Therefore, the waterproof performance is significantly improved.

Preferably, each top of the first and second flange parts projects higher than the guide member so that both said tops adhere to the cover.

With the construction described above, since the top of each flange part resiliently abuts against the cover, the top of the second flange part securely waterproofs the junction box even when water passes over the top of the first flange part.

Preferably, the top of the first flange part adheres to an inner surface of the cover while the top of the second flange part adheres to a packing in the cover.

With the construction described above, the first flange part directly adheres to the inner surface of the cover and resists against the high-pressure water with the strong adhering force. The second flange part resists against the water, the energy of which has been weakened, and waterproofs the junction box with the contact with the packing.

Thus, with the two-step shielding against water, the water is securely prevented from entering from between the flange and cover.

Preferably, a peripheral wall of the case is formed doubly inner and outer, the inner peripheral wall is formed higher than the outer peripheral wall, and the height of the first guide wall is set equal to that of the outer peripheral wall while the height of the second guide wall is set equal to that of the inner peripheral wall.

With the construction described above, even when water hits the outer peripheral wall and enters into the inside, the water is stopped by the high inner peripheral wall and prevented from entering into the inside of the inner peripheral wall. Further, the water which enters into the inside of the first guide wall hits the high second guide wall and thereby is prevented from entering further. Therefore, the cooperative action between each guide wall and the flange of the grommet significantly improves the waterproof performance.

Preferably, the bottom of the first guide wall is provided with a hole for draining water.

With the construction described above, water which enters inside the first guide wall is drained through the hole at the bottom, thereby the water pressure (i.e. water energy) which applies to the second flange part inside the second guide wall is reduced. Therefore, the second flange part securely waterproofs the junction box.

Preferably, the grommet is provided with a third flange part adjacently to the second flange part and the cover is provided with a third guide wall fitting with the third flange part.

With the construction described above, since the third flange part adheres to the third guide wall, the third flange part securely stops water in the event that the water passes through the second flange part. Further, the third flange part reinforces the second flange part so as to improve the waterproof performance of the second flange part. Therefore, the waterproof performance is significantly improved.

Preferably, the top of the third flange part adheres to the packing.

With the construction described above, the cooperative action between the top of the third flange part and the top of the second flange part securely prevents the water which passes through the first flange part from entering. Therefore, the waterproof performance is significantly improved.

Preferably, a reinforcing member is mounted in the flange and locked to the case by locking means.

With the construction described above, the flange is fixed to the case integrally with the reinforcing member, thereby -preventing the flange from coming out or from shifting in the guide member. Therefore, the waterproof performance is significantly improved.

DESCRIPTION OF THE PREFERRED EMBODIMENTS

In the following, the preferred embodiments of the present invention will be explained in detail with reference to the attached drawings.

Figure 1:
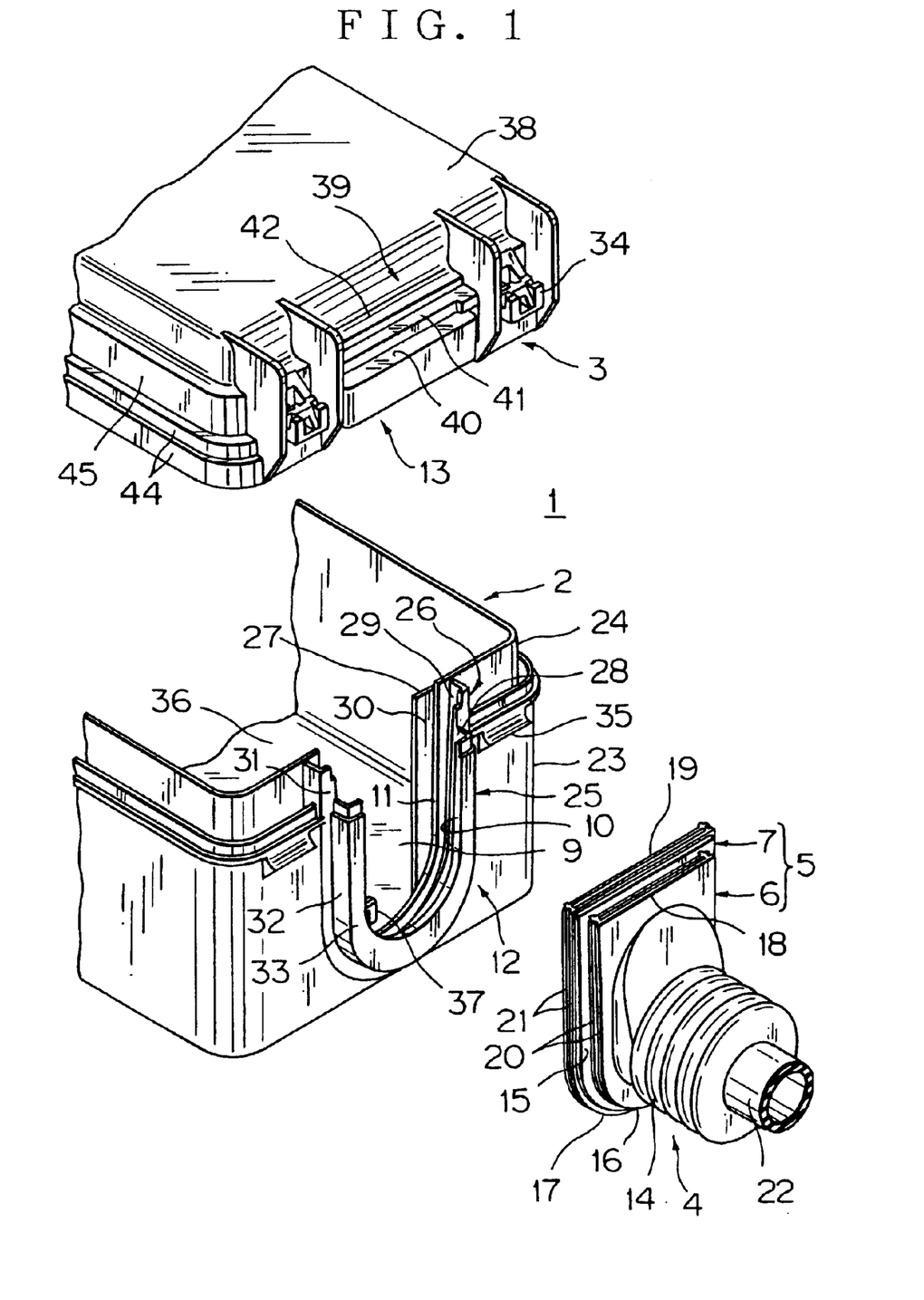
FIG. 1 is an exploded perspective view illustrating a preferred embodiment of a waterproof structure of an electric junction box according to the present invention.

FIG. 1 is an exploded perspective view illustrating a preferred embodiment of a waterproof structure of an electric junction box according to the present invention.

In the waterproof structure of a junction box 1, a flange 5 at the base side of a resilient grommet 4 made of synthetic rubber is formed to have at least two steps (i.e. two layers), while a guide member 12 fitting with the grommet along the periphery of a notch 9 of a case 2 made of synthetic resin and a part 13 fitting with the grommet of a cover 3 made of synthetic resin are formed to have at least two steps (i.e. two layers), respectively, in accordance with the shape of the flange 5 of the grommet 4.

As for the flange 5 of the grommet 4, a first flange part 6, which continues to a bellows 14, that is, be exposed to the outer surface side of the case 2, is formed small, while a second flange part 7, which faces the inside of the case 2, is formed large. Thus, since the outer side of the flange 5 is set low while the inner side thereof is set high, the second flange part 7 securely stops water even when the water passes through the outer periphery of the first flange part 6, thereby the water is securely prevented from entering into the case 2.

The first flange part 6 is projectingly formed from a front wall surface 15 of the second flange part 7. In this specification, the projecting direction of the grommet 4 is defined as the "front direction", which has no relationship with a direction of the practical use. Each flange part 6, 7 includes a U-shaped outer periphery 16, 17 and a straight outer periphery 18, 19 which horizontally connects the top of the outer periphery 16, 17, respectively. Each outer periphery 16, 18 of the first flange part 6 is situated nearer to the center than each outer periphery 17, 19 of the second flange part 7. That is, as for the whole periphery, the flange 5 is formed to have at least two steps (i.e. two layers).

The whole of the outer periphery of each flange part 6, 7 is provided with a plurality of lips 20, 21 (two lips in this embodiment). The front wall surface of the first flange part 6 is followed by the bellows 14, the front side of which is followed by a small-diameter cylinder 22, the front side of which is followed by a large-diameter cylinder (not shown in the figure). The large-diameter cylinder is fixed to an inside wiring harness (not shown) by being wound with a vinyl tape.

The case 2 made of synthetic resin is formed doubly having peripheral walls 23 and 24. The inner peripheral wall 24 is formed higher than the outer peripheral wall 23 so that the inner peripheral wall 24 stops water even when the water enters passing over the outer peripheral wall 23.

Both peripheral walls 23 and 24 are notched in a U-shape. At a position shifted a little outward in the width direction from an inside notch 11, a guide wall (the second guide wall) 26 having an L-shape in its sectional view is projectingly formed perpendicularly from the inner peripheral wall 24. The guide wall 26 connects both peripheral walls 23 and 24. A U-shaped guide groove (second guide groove) 29 fitting with the second flange part 7 of the grommet 4 is formed inside the guide wall 26 in its thickness direction. The guide groove 29 is formed inside of a wall constructed with the inner peripheral wall 24 and the U-shaped guide wall 26.

A front collar wall 31 of the guide wall 26 projects forward a little from the outer peripheral wall 23 integrally.

A first guide wall 25 having an L-shape in its cross sectional view fitting with the first flange part 6 of the grommet 4 is formed crossing the inner periphery of the front collar wall 31. The first guide wall 25 consists of a U-shaped peripheral wall 32 which crosses the front collar wall 31 of the second guide wall 26 and a collar wall 33 which crosses the peripheral wall 32. A first guide groove 28 is formed being surrounded by the two walls 32 and 33. The inner width of the first guide wall 25 is formed narrower than that of the second guide wall 26. The height of the first guide wall 25 is formed lower than that of the second guide wall 26 and is equal to that of the outer peripheral wall 23. The height of the second guide wall 26 is equal to that of the inner peripheral wall 24.

The outer peripheral wall 23 is provided with a locking claw 35 engaging with a rotary-type locking member 34 (a portion of a metal fittings thereof being not shown) of the cover 3 at both sides right and left of the first guide wall 25. Inside of the notch 11 of the inner peripheral wall 24, a pair of third guide walls 27 (see FIG. 6) having a L-shape in its cross sectional view fitting with a third flange part 8 (see FIG. 5) situated at the rear side of the grommet 4 is formed. On the bottom wall 36 of the case 2, a locking piece (locking means) 37 for locking a reinforcing member 91 (see FIG. 5) of the grommet 4 is formed. The construction of these will be explained in detail later on.

The cover 3, which is flatter than the case 2, includes a top wall 38, peripheral wall 39 and the locking member 34 (a portion of a metal fittings thereof being not shown) formed on the peripheral wall 39. The part 13 fitting with the grommet, which is a front part of the peripheral wall 39, is formed to have three steps (four steps if the top wall 38 being included). A step 40 situated at lowest protrudes outward and receives the upper end of the first flange part 6 of the grommet 4 inside. The second and third steps 41 and 42 from below, respectively, are provided with a packing 43 (see FIG. 10) inside. The upper end of the second flange part 7 of the grommet 4 is situated on the lower side of the second step 41 while the upper end of the third flange part 8 (see FIG. 3) is situated on the lower side of the third step 42, thereby each upper end adheres to the packing 43.

On each side of the peripheral wall 39 of the cover 3, there are provided stepwise a member 44 for receiving the upper end of the outer peripheral wall 23 of the case 2 and a member 45 for receiving the upper end of the inner peripheral wall 24. The upper end of the inner peripheral wall 24 adheres to the packing 43. The case 2 and the cover 3 constitute the body of the junction box.

Figure 2:
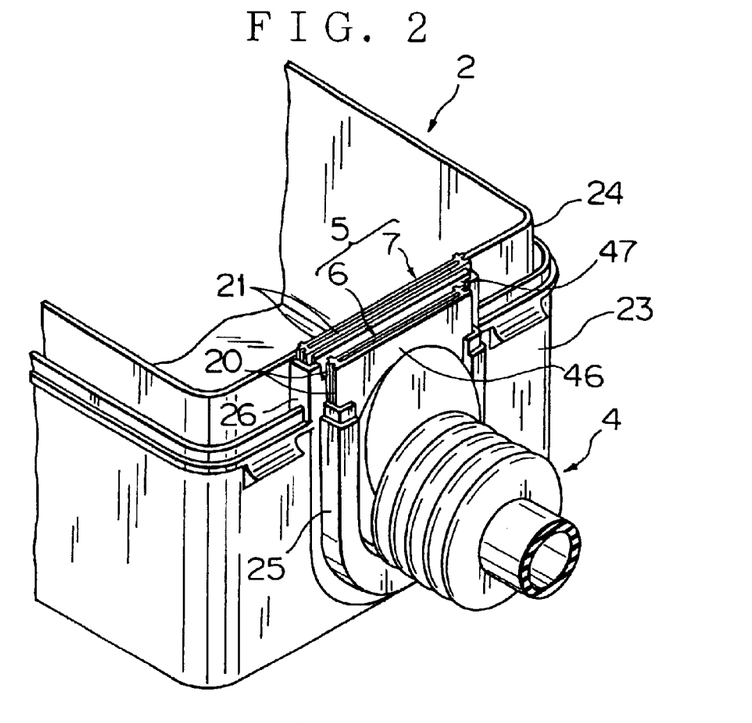
FIG. 2 is a perspective view illustrating a state that a grommet is mounted to a case.

FIG. 2 is a perspective view illustrating a state that the grommet 4 is mounted to the case 2.

The first flange part 6 of the grommet 4 fits in the first guide wall 25 of the case 2 while the second flange part 7 fits in the second guide wall 26. Each lip 20, 21 formed on the outer periphery of the corresponding flange part 6, 7 adheres to the inner peripheral surface of the guide wall 25, 26, respectively, while each wall surface 46, 47 at the front side of the corresponding flange part 6, 7 adheres to the inner surface of the guide wall 25, 26, respectively. With the construction described above, the notch 9 (see FIG. 1) of the case 2 for guiding out the wiring harness is doubly sealed by the flange 5 of the grommet 4. The notch 9 includes an outer notch 10 and inner notch 11.

The top of the first flange part 6 projects upward from the first guide wall 25 while the top of the second flange part 7 projects upward from the second guide wall 26. The top of the first flange part 6 is situated at about the same level with that of the upper end of the second guide wall 26 while the top of the second flange part 7 is projectingly situated a little higher than the upper end of the second guide wall.

Figure 9:
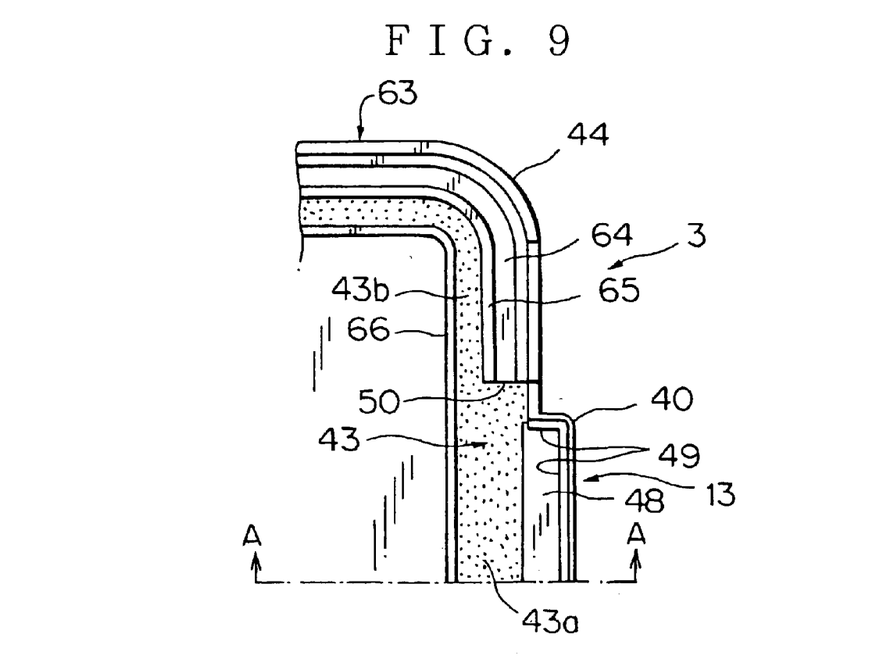
FIG. 9 is a plan view (bottom view) illustrating a primary part of a cover.

When the cover 3 covers the case 2, to which the grommet 4 has been mounted, the upper end, both sides at the upper side and the front surface at the upper side of the first flange part 6 abut against and adhere to the inner surface (i.e. a horizontal surface 48 and three perpendicular surfaces 49 in FIG. 9) of the lowest step 40 of the cover 3, the lip 21 at the upper end of the second flange part 7 abuts against and adheres to the lower surface of the packing 43 (see FIG. 10) in the step 41 (see FIG. 1), and both sides at the upper side of the second flange part 7 adheres to a perpendicular wall surface 50 (see FIG. 9) inside the step 41. Thereby, a gap between the case 2 and cover 3 is doubly sealed by the flange 5 of the grommet 4.

Figure 3:
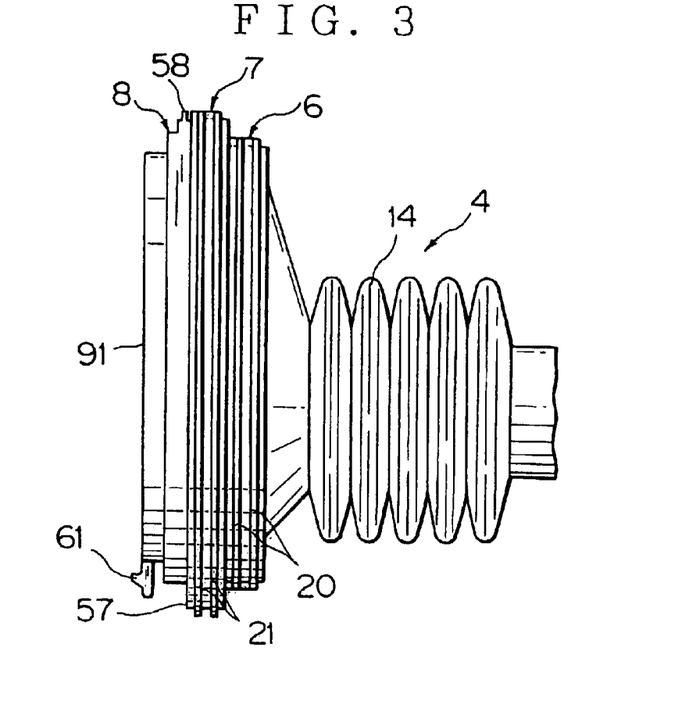
FIG. 3 is a side view illustrating a grommet.
Figure 4:
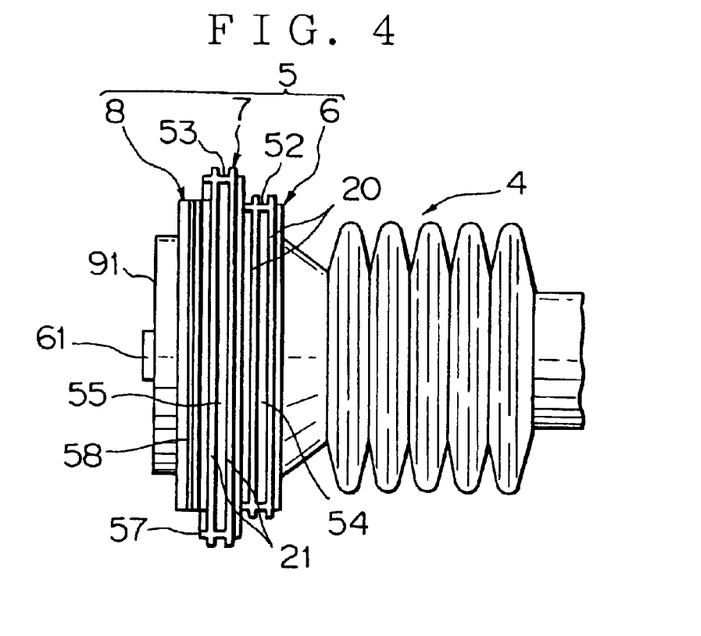
FIG. 4 is a plan view illustrating the grommet.
Figure 5:
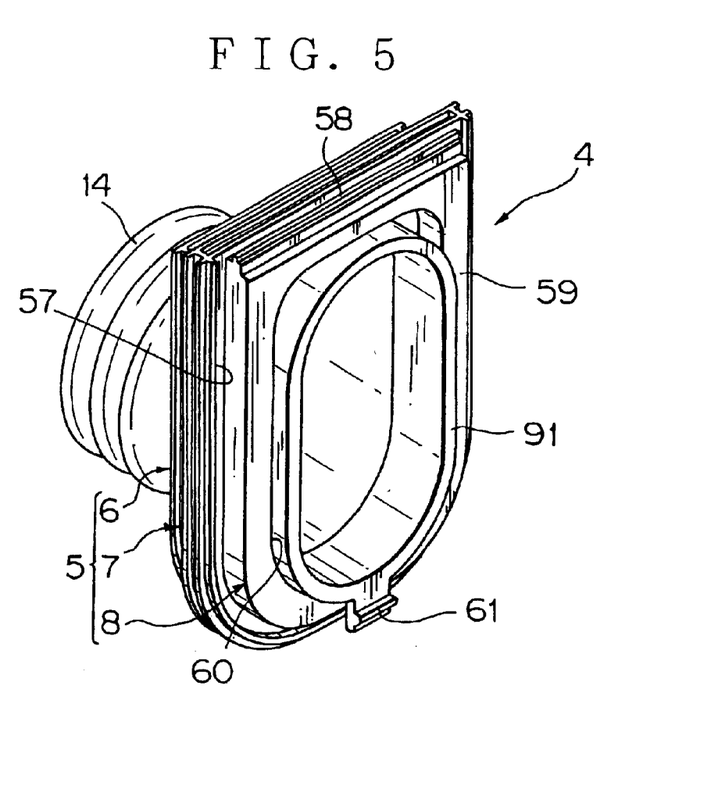
FIG. 5 is a perspective view illustrating a primary part of the grommet viewed from the rear.

FIG. 3 is a side view illustrating the grommet 4. FIG. 4 is a plan view illustrating the grommet 4. FIG. 5 is a perspective view illustrating a primary part of the grommet 4 viewed from the rear.

The first flange part 6, which continues to the bellows 14, is situated a little lower than and has about the same size with the third flange part 8 at the back. The second flange part 7 situated between the first and third flange parts 6 and 8 projects in four directions (the height direction and width direction) greater than the first and third flange parts 6 and 8.

Each of the first and second flange parts 6 and 7 has the two lips 20 and 21, respectively, on the outer peripheral thereof. Each lip 20 and 21 (see FIG. 4) at the upper end is connected to the other lip 20 and 21 by a short lip 52 and 53, each of which is situated at both sides right and left extending in the thickness direction of the flange part, respectively, thereby each of the first and second flange parts 6 and 7 has a space 54 and 55, respectively, surrounded by the lips at front and rear and at right and left. The lips 52 and 53 prevent water from entering from the sides. The water entered in between the lips 20 or lips 21 falls on the bottom of the guide wall 25 of the case 2 and drained through a hole 56 (see FIG. 7) formed in the bottom.

Further, the second flange part 7 is provided with a lip 57 projectingly formed having a U-shape near the outer periphery. The lip 57 adheres to the inside peripheral wall 24, thereby further improving the waterproof performance.

The third flange part 8 (see FIG. 5) is provided with a horizontal lip 58 only at the front of the upper, end, which is situated at the same level with that of the lip 21 of the second flange part 7 and abuts against the packing 43 (see FIG. 10) in the cover 3 together with the lip 21, thereby strengthening the action for preventing water from entering from above. A rear wall surface 59 (see FIG. 5) near to both sides right and left of the third flange part 8 adheres to the inner surface of a pair of third guide walls 27 (see FIG. 6) of the case 2, thereby water is prevented from entering with three stages.

A flange (not shown) of the stiff reinforcing member 91 fits into a groove (not shown) inside the second flange part 7 from a rear opening 60 (see FIG. 5) of the third flange part 8 and the reinforcing member 91 provides a tension to the resilient flange 5 of the grommet 4, thereby enhancing the abutting pressure and improving the sealing performance. A flexible locking claw (locking member) 61 is integrally formed dependingly from the lower end of the reinforcing member 91 and the locking claw 61 engages with the locking piece 37 (see FIG. 6) of the case 2, thereby the flange 5 of the grommet 4 is firmly fixed without coming out (shifting) upward.

Figure 6:
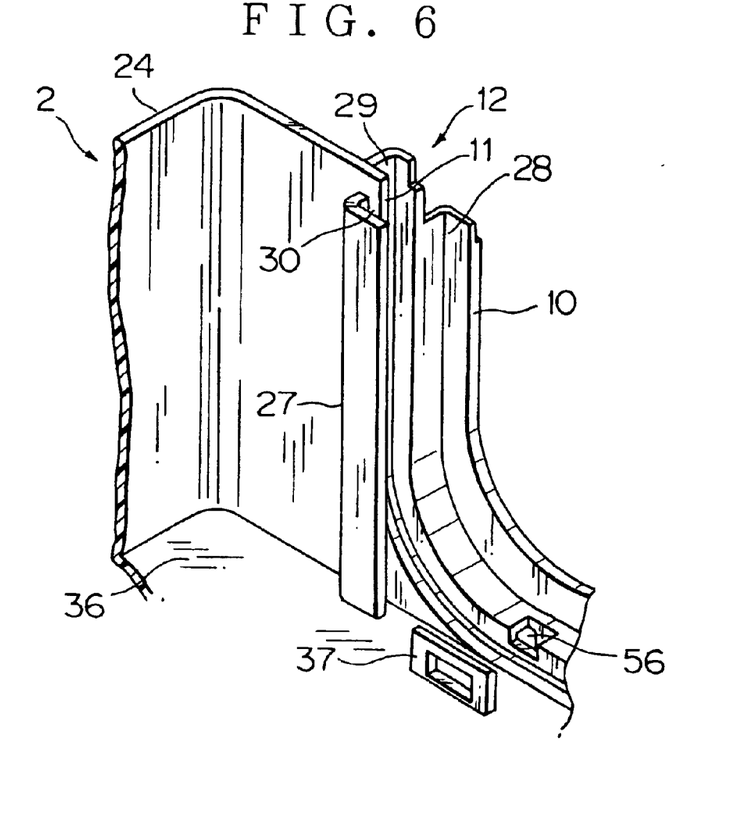
FIG. 6 is a perspective view illustrating a primary part of the case viewed from the inside.
Figure 7:
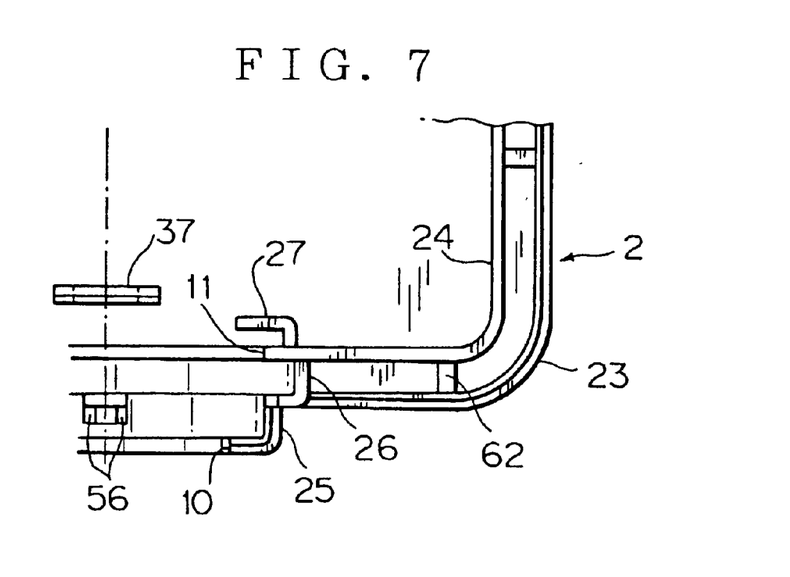
FIG. 7 is a plan view illustrating a primary part of the case.
Figure 8:
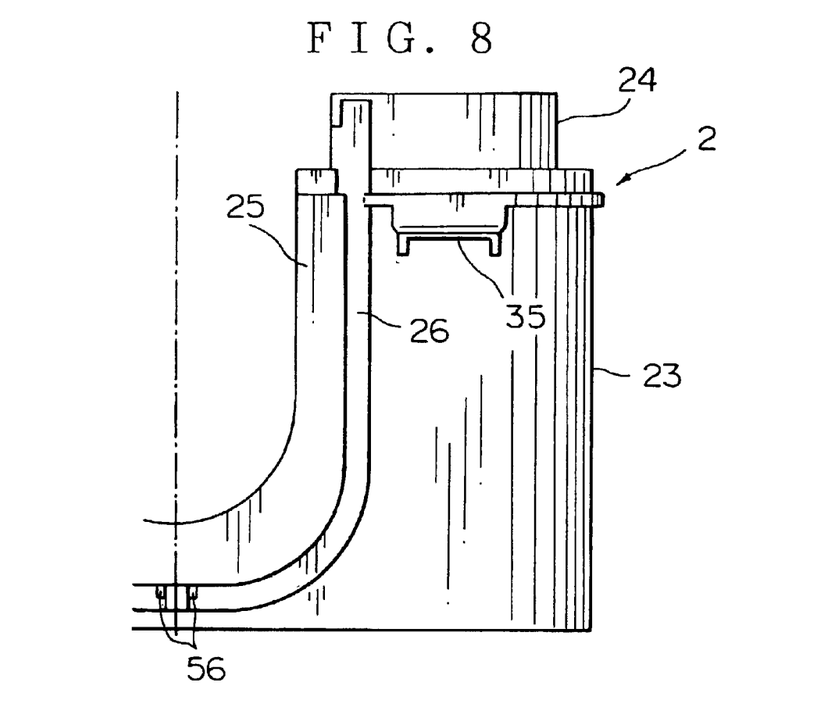
FIG. 8 is a front view illustrating a primary part of the case.

FIG. 6 is a perspective view illustrating the guide member 12 of the case 2 and the vicinity viewed from the inside. FIG. 7 is a plan view thereof. FIG. 8 is a front view thereof.

With respect to the notch 11 of the peripheral wall 24 inside the case 2, there are provided the second and first guide walls 26 and 25 in turn at the front side and the third guide wall 27 at the rear side. The outer peripheral wall 23 (see FIG. 7) crosses the second guide wall 26. Both peripheral walls 23 and 24 are joined to each other and reinforced by a rib 62 (see FIG. 7). A hole 56 for draining water is formed in the bottom of the first guide wall 25. The hole 56 also acts as an air vent upon the insertion of the grommet 4.

The level of the first guide wall 25 is lower than that of the second guide wall 26. The level of the third guide wall 27 is an intermediate level therebetween. The inner width in the right-and-left direction of the first guide wall 25 is shorter than that of the second guide wall 26. The inner width of the third guide wall 27 is an intermediate width therebetween. Each of the first and second guide walls 25 and 26 bends in a U-shape. The third guide wall 27 straightly extends perpendicularly from the bottom wall 36 of the case 2.

Figure 10:
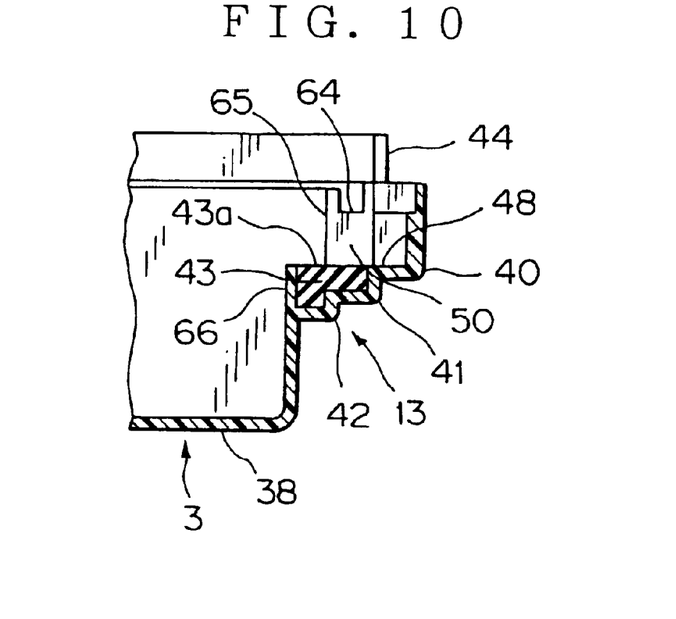
FIG. 10 is a cross sectional view of the cover taken along A—A line in FIG. 9.

FIG. 9 is a plan view (bottom view) illustrating a front-side central part of the cover 3 fitting with the guiding member 12, that is, a part 13 fitting with the grommet. FIG. 10 is a cross sectional view of the cover 3 taken along A—A line in FIG. 9.

The first step 40 fitting with the first flange part 6 of the grommet 4 (see FIG. 1) projects forward and has a perpendicular front wall, both side walls 49 and a horizontal upper wall 48. The upper end of the first flange part 6 abuts against a horizontal inner side surface of the upper wall 48. A wide-width part 43a of the soft packing 43 made of urethane and the like, which has about the same level with the horizontal inner side surface of the upper wall 48, fits in a space inside the second and third steps 41 and 42. The packing 43 is formed in a rectangular ring-shaped and the wide-width part 43a thereof projects forward.

A peripheral wall part 63 (see FIG. 9) except for the front-side central part of the cover 3 extends longer than the first step 40 downward toward the case 2. A rib-shaped inner peripheral wall 65 is situated inside the first step 44 of the peripheral wall part 63 through a peripheral groove 64. The upper end of the outer peripheral wall 23 of the case 2 abuts against and fits into the peripheral groove 64. The inner peripheral wall 65 continues to the perpendicular wall 45 (see FIG. 1), which constitutes the third step from below. A narrow-width part 43b of the packing 43 fits in between the inner peripheral wall 65 and an inner peripheral wall 66 inside thereof. The upper end of the inner peripheral wall 24 of the case 2 abuts against the narrow-width part 43b. The most inside inner peripheral wall 66 is shorter than the intermediate inner peripheral wall 65 in the height direction and has about the same level with that of the inside horizontal surface 48 of the first step 40 (see FIG. 10) of the front-side central part. The inner peripheral wall 66 crosses the top wall 38.

The second flange part 7 of the grommet 4 and the peripheral wall 24 inside the case 2 press and adhere to the packing 43 in a body. As shown in FIG. 2, the second flange part 7 strongly adheres to the packing 43 since it projects a little more upward compared to the inside peripheral wall 24, thereby further improving the waterproof performance.

The aforementioned preferred embodiments are described to aid in understanding the present invention and variations may be made by one skilled in the art without departing from the spirit and scope of the present invention.

What is claimed is:

1. A waterproof structure of an electric junction box comprising:
   a case including a notch and a guide member formed along the periphery of the notch;
   a resilient grommet for inserting a wiring harness therethrough including a flange which fits into the guide member; and
   a cover for covering the case from above the flange,
   wherein the flange includes at least two flange parts formed integrally with each other stepwise, a height and width of the first flange part situated relatively farther from the case being formed smaller than those of the second flange part situated relatively nearer to the case, respectively,
   wherein the case is provided with first and second guide walls fitting with the first and second flange parts, respectively, as the guide member.

2. The waterproof structure of an electric junction box according to claim 1, wherein each top of the first and second flange parts projects higher than the guide member so that both said tops adhere to the cover.

3. The waterproof structure of an electric junction box according to claim 2, wherein the top of the first flange part adheres to an inner surface of the cover while the top of the second flange part adheres to a packing in the cover.

4. The waterproof structure of an electric junction box according to claim 1, wherein a peripheral wall of the case is formed doubly inner and outer, the inner peripheral wall is formed higher than the outer peripheral wall, and the height of the first guide wall is set equal to that of the outer peripheral wall while the height of the second guide wall is set equal to that of the inner peripheral wall.

5. The waterproof structure of an electric junction box according to claim 1, wherein the bottom of the first guide wall is provided with a hole for draining water.

6. The waterproof structure of an electric junction box according to claim 1, wherein the grommet is provided with a third flange part adjacently to the second flange part and the cover is provided with a third guide wall fitting with the third flange part.

7. The waterproof structure of an electric junction box according to claim 6, wherein the top of the third flange part adheres to the packing.

8. The waterproof structure of an electric junction box according to claim 1, wherein a reinforcing member is mounted in the flange and locked to the case by locking means.

* * * * *